Oct. 20, 1964   F. H. ATTIX   3,153,725
RADIOACTIVE SOURCE CONFIGURATION
FOR PRODUCING A UNIFORM FIELD
Filed Jan. 30, 1961   4 Sheets-Sheet 2
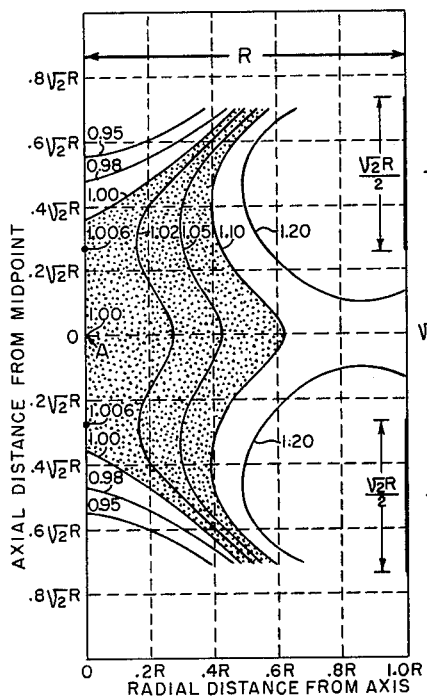
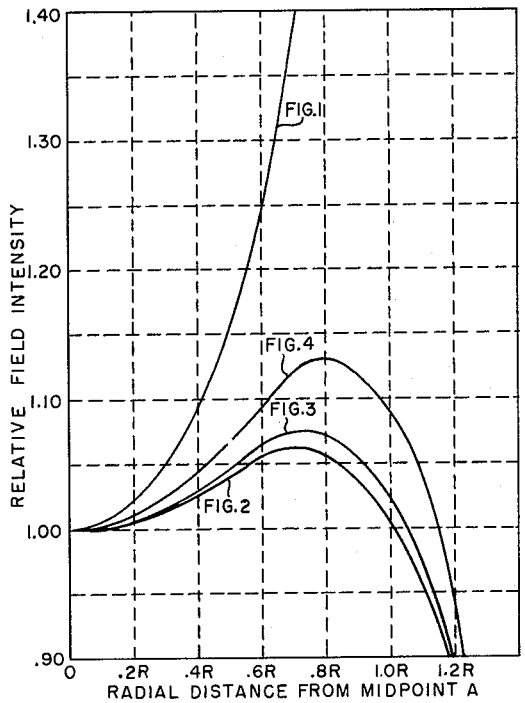
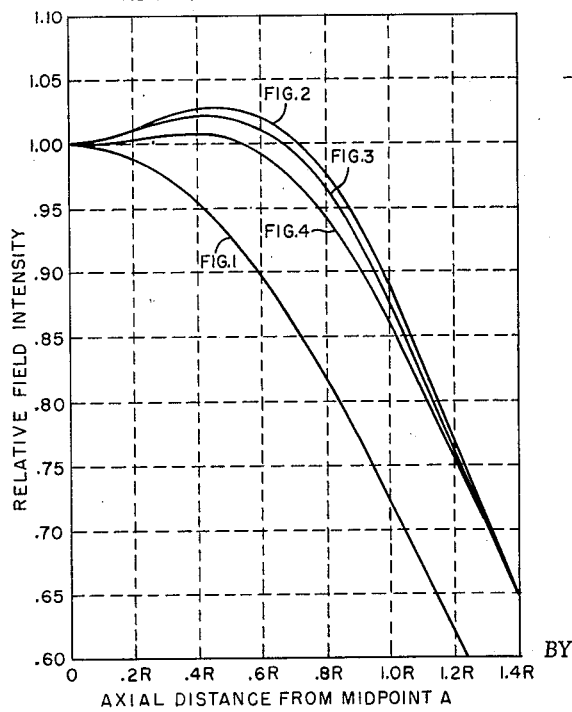
INVENTOR
FRANK H. ATTIX
BY
ATTORNEY

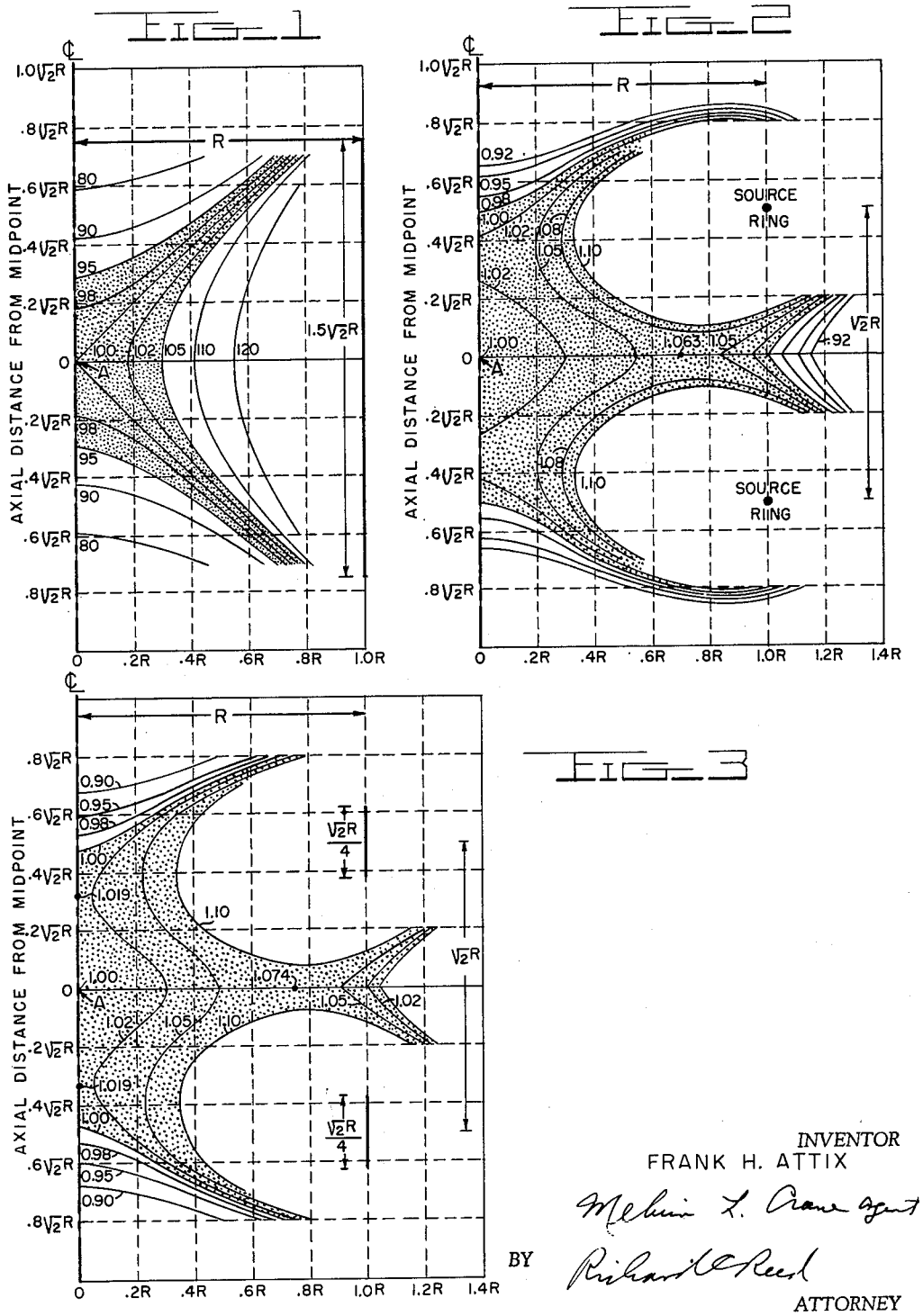

INVENTOR
FRANK H. ATTIX

Oct. 20, 1964     F. H. ATTIX     3,153,725
RADIOACTIVE SOURCE CONFIGURATION
FOR PRODUCING A UNIFORM FIELD
Filed Jan. 30, 1961     4 Sheets-Sheet 4
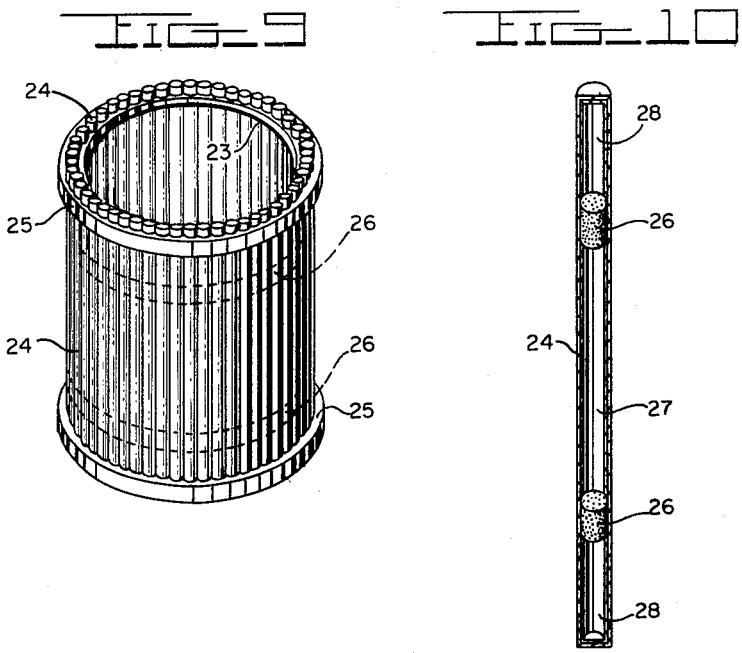
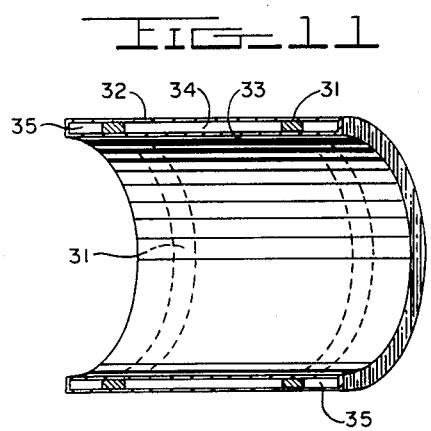
INVENTOR
FRANK H. ATTIX
BY
ATTORNEY

United States Patent Office 3,153,725
Patented Oct. 20, 1964

3,153,725
RADIOACTIVE SOURCE CONFIGURATION FOR PRODUCING A UNIFORM FIELD
Frank H. Attix, 5125 27th Ave. SE.,
Hillcrest Heights 21, Md.
Filed Jan. 30, 1961, Ser. No. 85,925
7 Claims. (Cl. 250—106)
(Granted under Title 35, U.S. Code (1952), sec. 266)

The invention described herein may be manufactured and used by or for the Government of the United States of America for governmental purposes without the payment of any royalties thereon or therefor.

The present invention relates to radioactive source configurations and more particularly to radiation sources which gives rise to substantially uniform radiation field strengths throughout specific regions.

Irradiation research is becoming more and more widespread with the increased availability of large quantities of radioactive materials, which can now be inexpensively produced in atomic reactors. By assembling a group of radioactive sources into a close array, it is possible to produce radiation fields of extremely great intensity, capable of causing observable damage or other effects within materials exposed for relatively short periods of time.

The measurement and interpretation of such effects is greatly simplified if the absorbed dose (i.e., energy absorbed from the ionizing radiation) is uniformly distributed throughout the irradiated sample. However the close proximity of the sample to the radioactive source tends to give rise to a radiation field which is not uniform in strength within the dimensions of the sample, even if the latter is small. This is because the radiation field strength near a "point" source of radiation (e.g. gamma radiation), varies as the inverse square of the distance from the source to the point of observation. Close proximity of sample to source is nevertheless dictated by the need for large field intensity.

Heretofore, various types and shapes of radiation source configurations have been used for irradiating samples. In the past these prior art source configurations have provided a uniform field throughout only a small region of high field-strength. One such configuration consists of a cylindrical shell, usually approximated by a group of rod-shaped sources of radiating material arranged in a cylindrical array. (A typical commercially available gamma ray source having this configuration is shown and disclosed in a brochure, Folder #GC-4, 9-1958, by Atomic Energy of Canada Limited, Commercial Products Division, P. O. Box 93, Ottawa, Canada.) This source configuration gives rise to a γ-radiation field like that shown by illustration in FIG. 1. The (shaded) region throughout which the field-strength is constant within ±5% extends radially about 0.3R from the midpoint A, and extends about 0.4R in either direction along the length of approximately 2R. Furthermore the field strength changes rapidly and continuously along the axis, being a maximum at central point A, and decreasing in both directions along the axis, as is shown by the curve in FIG. 6. Radially from A it increases rapidly, reaching very large values as the position approaches the radius R, as shown by the curve in FIG. 5.

It is therefore an object of the present invention to provide cylindrical source configurations within which the field intensity will be more nearly constant, both along the axis and radially, and within which shall exist a larger region of uniform field strength.

Another object is to provide radiation source configurations which give rise to uniform fields over certain cylindrical surfaces.

Still another object is to provide radiation-source configurations capable of more uniformly irradiating test materials or samples.

Still another object is to provide new arrangements for radiation sources.

Other and more specific objects of the invention will become apparent upon a careful consideration of the following detailed description when taken together with the accompanying drawings in which:

FIG. 1 illustrates the radiation field within a typical, prior art cylindrical source configuration, having a radius R and a length approximately 2R.

FIG. 2 illustrates the radiation field within a double-ring source configuration of the present invention, the radius being R and the ring separation $\sqrt{2}R$.

FIG. 3 illustrates the radiation field within a double-band source configuration of the present invention, the radius being R, each band of width $\sqrt{2}R/4$, and the band-centers separated by $\sqrt{2}R$.

FIG. 4 illustrates the radiation field within a double-band source configuration of the present invention, the radius being R, each band of width $\sqrt{2}R/2$, and the band-centers separated by $\sqrt{2}R$.

FIG. 5 is a graph illustrating the field strength radially outward from point A within the source configurations shown in FIGS. 1–4.

FIG. 6 is a graph illustrating the field strengths along the axis of the source configurations shown in FIGS. 1–4.

FIG. 9 is a perspective view of a suitable radiation source configuration approximating the double-ring design whose field is shown in FIG. 2 comprising a cylindrical grouping of individual rods, each containing two pieces of radiating material, separated by spacers to a distance of $\sqrt{2}R$ between centers.

FIG. 10 illustrates a cross-sectional view of one radiating source section of the configuration shown in FIG. 9 which illustrates a single radiating source element, which may also serve in the design shown in FIG. 8.

FIG. 11 is a cross-sectional view of a modification which illustrates the fuel sections made into coaxial rings, the planes of which are parallel and spaced from each other by $\sqrt{2}R$.

Figure 7:
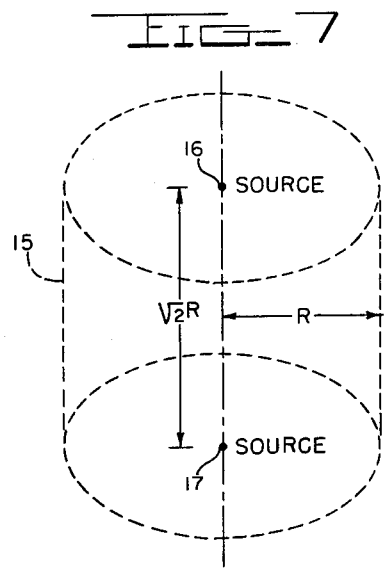
FIG. 7 illustrates a modification of the source configurations shown in FIGS. 2–4. The variation of field strength along the length of this cylinder is the same as that along the axis of the corresponding double-ring or double-band configuration, and is given in FIG. 6 in graphical form.

It is the teaching of this invention that double-band or double-ring source configurations of mean radius R should have a mean center-to-center separation of approxi $\sqrt{2}R$, as shown in FIGS. 2–4, 7–9, and 11. It is also the teaching of this invention that double-point or double-rod, sources as in FIGS. 7 and 8, should have a mean, center-to-center separation of approximately $\sqrt{2}R$ in order to give rise to a uniform field on the coaxial cylinder of radius R.

The widths of the source bands shown in FIGS. 3 and 4 are chosen arbitrarily to show the effect of bandwidth upon the field uniformity. Any bandwidth may be employed without departing from the teachings of this invention, if the mean center-to-center separation of the bands remains approximately $\sqrt{2}R$, R being the band radius. However, if the bandwidths are increased until each equals $\sqrt{2}R$, so that the two bands merge into one cylinder, then the source configuration becomes prior art, and is therefore not a part of this invention. This same consideration applies to the double-rod source shown in FIGS. 7 and 8.

In each of the source configurations shown in FIGS. 2–4 and 7–11, the specific strength of the radiating material is approximately uniform throughout the configuration, and self-absorption of radiation within the source material is negligible, so that the radiation is emitted isotropically from each point on the source.

The source bands, rings, rods, or points shown in FIGS. 2–4 and 7–11 may be approximated by any suitable assemblage of pieces of radiating material without departing from the teachings of this invention. For example, the bands may be actually made up of groups of coaxial rings of source material, as shown by FIG. 11, or of a multiplicity of rod-shaped sources with axes parallel to the axis of their cylinder of locus, as shown by FIG. 9, or of a number of individual pieces each approximating a point source, or of any other grouping of sources which, taken together, approximate a band. For a further example, a point source may be approximated by a small spherical, cylindrical or other shaped source centered at the position of the point source. No such substitution constitutes a departure from the teachings of this invention.

Configurations such as those shown in FIGS. 2–4 and 7–11 can be made with any suitable gamma-radioactive material such as cobalt–60, cesium–137, or iridium–192. Alternatively, they can be made with any material which emits radiation of a type such that the field-strength varies as the inverse square of the distance from a point source of that type of radiation, and such that the individual contributions to the field strength at a point can be summed up as scalar, rather than vector, quantities.

For example, any kind of light constitutes such a radiation, and incoherent light sources adapted to the configurations described in this invention can be used to produce regions of uniform light intensity. In particular two equal and isotropic incoherent point sources of light located as shown in FIGS. 7 and 8 will produce uniform light intensity on the specified cylindrical surface, as measured by an isotropic detector.

FIGURES 2, 3 and 4 have shaded regions, corresponding to that in FIG. 1, throughout which the field intensity is uniform within ±5% wherein the values given on the heavy lines represent field strengths axially and radially relative to the midpoint A. It is evident in each case that the uniform regions are considerably larger, both axially and radially, than in the prior art source configurations shown in FIG. 1. FIGURES 5 and 6 show the radial and axial intensity variations in detail. The degree of uniformity is evidently greatly improved in the configurations set forth in the present invention, shown in curves for FIGS. 2, 3 and 4.

Figure 8:
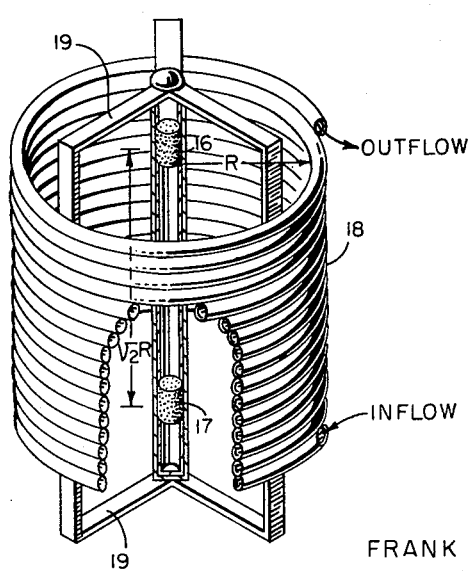
FIG. 8 is a perspective view of an application of the source configuration shown in FIG. 7, suitable for irradiation of a fluid in a uniform gamma-ray field.

The source configurations giving rise to uniform field strengths over a cylindrical surface at 15, such as shown in FIGS. 7 and 8, are useful for exposing a multitude of small objects to a uniform radiation field. For example, many small animals can be exposed to a uniform gamma-ray field by locating them on said cylindrical surface centered upon a pair of γ-ray sources 16 and 17 disposed as in FIG. 7. Or, for another example, a fluid passed through a tube 18, which is wound in a helix around the above cylindrical surface, as shown in FIG. 8, would be exposed to a uniform field of radiation everywhere in the helical path. The source, cylindrical surface, and helix tube can be supported by any suitable means such as support brackets 19 as shown by illustration in FIG. 8.

FIG. 9 illustrates another configuration in which the radiating material is made as a cylinder which comprises a stainless steel cylinder 23 surrounded by a plurality of tubular radiating material holders 24 which are retained in position by rings 25 positioned near the bottom and top thereof, as shown. Each of the tubular holders are provided with sections of radiating material 26 near each end thereof of equal field activity which are separated axially by a spacing or a non-radiating section 27. The radioactive material sections 26 are made as a separate part and fitted into the tubular holder with spacer 27 therebetween and a plug 28 at each end which holds the sections 14 in place as shown in FIG. 10.

The modification shown by illustration in FIG. 11 is effectively the same as the source shown by illustration in FIG. 9 only the radiation source material is made into a ring 31 which fits within the spacing between two cylinders 32 and 33 with the radioactive material rings separated from each other by a suitable spacer 34 with suitable rings 35 on each end of the radioactive material. The relationship of the radioactive source rings is the same as for the structure of FIGS. 9 and 10.

Any other such structure may be made by one skilled in the art without departing from the teaching of the invention so long as the radioactive source material is effectively cylindrical and the centers of the radiation sources are spaced from each other by a distance $D=2\sqrt{R}$ where R is the mean radius of the ring formed by the radioactive source as shown by the sources of FIGS. 2–4.

Structures such as described and shown by illustration will provide radiation sources which are substantially uniform over the usable area of the source configuration which will permit research to be carried out with a more accurate irradiation of a sample.

Obviously many modifications and variations of the present invention are possible in the light of the above teachings. It is therefore to be understood that within the scope of the appended claims the invention may be practiced otherwise than as specifically described.

What is claimed is:

1. A radioactive source configuration for producing a uniform radiation field which comprises a plurality of elongated tubular radiation source holders assembled side by side in a cylindrical configuration, each of said holders comprising two axially aligned sections of radioactive material of equal field activity, and a linear spacer positioned along the axes of each tubular holder to maintain a specific axial spacing between said radioactive material sections in each of said tubular holders, said tubular holders providing axially spaced circular radioactive sources in said cylindrical configuration.

2. A radioactive source as claimed in claim 1 wherein said two axially aligned radioactive material sources in each of said tubular holders are separated by a distance $D=\sqrt{2R}$ on centers where R is the mean radius of said circular radioactive sources of said circular configuration.

3. A radioactive source configuration for producing a uniform radiation field which comprises two radially spaced coaxial cylinders, two axially aligned rings of radioactive material secured within the spacing between said radially spaced cylinders, said rings of radioactive material being axially spaced from each other and secured in place within the spacing between said spaced cylinders.

4. A radioactive source configuration for producing a uniform radiation field as claimed in claim 3 wherein said two axially aligned rings of radioactive material are separated by a distance $D=\sqrt{2R}$ on centers, where R is the means radius of said ring of radioactive material.

5. An irradiation facility for producing a uniform radiation field which comprises first and second radiation sources of equal activity, a radiation source holder for securing said radiation sources with their centers separated by a distance of $D=\sqrt{2R}$, an object holder, said object holder positioned relative to said radiation sources wherein objects to be uniformly irradiated are positioned with their centers on a line parallel to and spaced from said center line through said radiation sources by a distance R and bounded by parallel planes through the centers of said radiation sources perpendicular to said line through said centers of said radiation sources whereby objects held by said object holder are uniformly irradiated.

6. An irradiation facility for producing a uniform radiation field which comprises two separate radiation sources of equal activity, radiation source holding means for linearly spacing said radiation sources along a line through their centers with their centers separated by a distance of $D=\sqrt{2R}$, said radiation sources producing a uniform radiation field along a cylindrical surface traced by a line parallel to said line through the centers of said radiation sources in which said traced cylindrical surface has a radius of, R, and is bounded in length by parallel planes through the center of each of said radiation sources perpendicular to the line through the centers of said radiation sources, and an object holding means for holding objects to be irradiated with the centers of said objects on the cylindrical surface traced by said line parallel to said line through the center of said radiation sources whereby said objects are uniformly irradiated.

7. An irradiation facility which comprises first and second radiation sources of equal activity, a radiation source holder for positioning said radiation sources with their centers separated by a distance of $D=\sqrt{2R}$ along a line through their center, a cylindrical holder of radius, R, and length $D=\sqrt{2R}$ upon which objects to be uniformly irradiated are secured, said cylindrical holder being symmetrically disposed with respect to said radiation sources with its axis passing along said line through the centers of said first and second radiation sources.

References Cited in the file of this patent

UNITED STATES PATENTS

| | | |
|---|---|---|
| 2,822,776 | Morganstern | Feb. 11, 1956 |
| 2,967,942 | Davis et al. | Jan. 10, 1961 |
| 2,992,980 | Suttle | July 18, 1961 |

UNITED STATES PATENT OFFICE
CERTIFICATE OF CORRECTION

Patent No. 3,153,725                                  October 20, 1964

Frank H. Attix

It is hereby certified that error appears in the above numbered patent requiring correction and that the said Letters Patent should read as corrected below.

Column 2, lines 54 and 55, for "approxi" read -- approximately --; lines 67 and 69, for "$\sqrt{2R}$", each occurrence, read -- $\sqrt{2} R$ --; column 4, line 19, for "$D=2\sqrt{R}$" read -- $D=\sqrt{2} R$ --; same column 4, lines 47, 60 and 66, column 5, line 5, and column 6, lines 3 and 5, for "$D=\sqrt{2R}$", each occurrence, read -- $D=\sqrt{2} R$ --.

Signed and sealed this 6th day of April 1965.

(SEAL)
Attest:

ERNEST W. SWIDER                            EDWARD J. BRENNER
Attesting Officer                           Commissioner of Patents